Feb. 8, 1966 D. E. KELLY 3,233,829
ANTI-OVERSHOOT THERMOSTATIC VALVE
Filed June 23, 1964
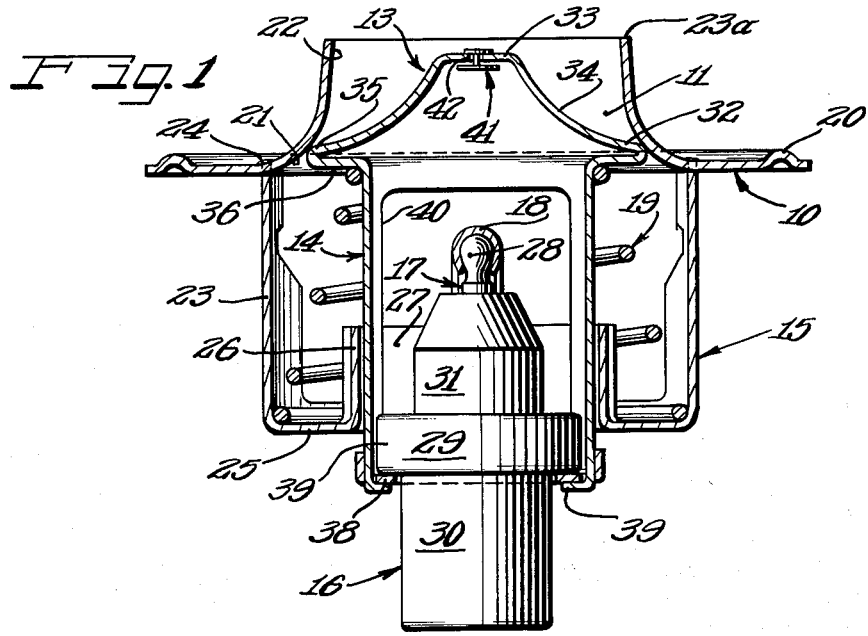
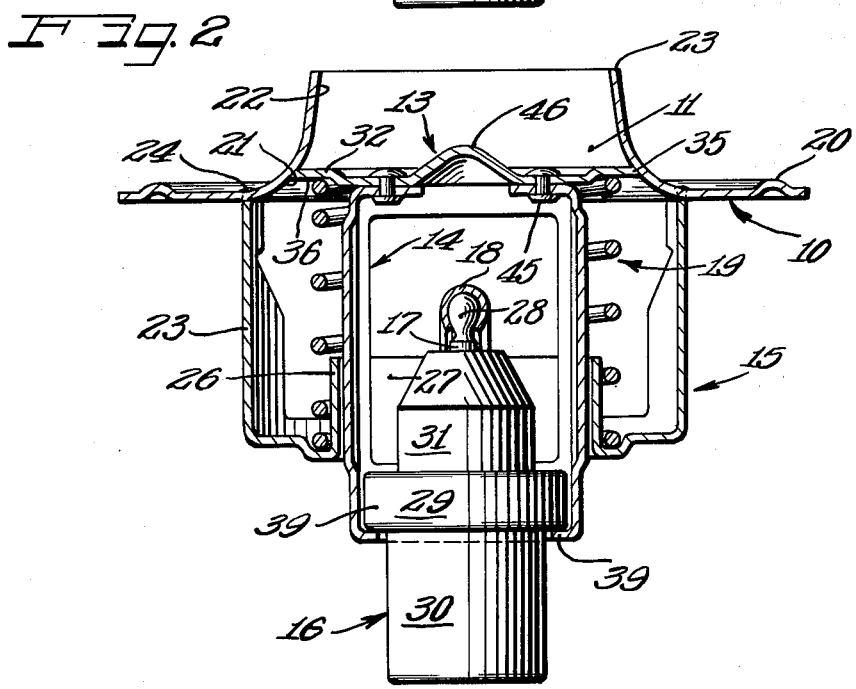
INVENTOR.
Douglas E. Kelly
by Hill, Sherman, Meroni, Gross & Simpson
ATTORNEYS United States Patent Office 3,233,829
Patented Feb. 8, 1966

3,233,829
ANTI-OVERSHOOT THERMOSTATIC VALVE
Douglas E. Kelly, Northfield, Ill., assignor to The Dole Valve Company, Morton Grove, Ill., a corporation of Illinois
Filed June 23, 1964, Ser. No. 377,239
15 Claims. (Cl. 236—34)

The present invention relates to waterline thermostats and more particularly relates to an improved thermostat which is designed to render the usual temperature sensitive power unit generally employed in such devices relatively insensitive to the variances in temperatures downstream of the thermostat valve member and thereby more accurately sensitive to the temperatures of liquid upstream of the valve member.

Automotive manufacturers have found that current model thermostats often fail to open at the "rated temperature" and that in many instances opening does not take place until the temperature of the water on the upstream or engine side of the thermostat has risen to 50 or 60 degrees above the "rated temperature" of the thermostat. It has been found that the problem is particularly acute when temperatures on the downstream, cold, or radiator side of the thermostat are particularly low.

In accordance with the instant invention the entire thermal sensitive power unit is isolated as nearly as is practically possible from the relatively cold temperatures on the downstream side of the valve member. In this way the power unit is completely immersed within engine coolant on the upstream side of the thermostat and there is no direct contact between any part of the power unit and the valve head. As a result, the power unit does not have the cold temperatures from the downstream or radiator side of the thermostat communicated to it and it does, therefore, much more accurately sense the temperature of the upstream coolant and effect opening of the thermostat when the upstream coolant has reached the "rated temperature" of the power unit.

Another important advantage obtains with the novel design herein disclosed. The power member stirrup is located on the upstream side of the flow port and, since it requires no top bracket, the flow rate capability of this thermostat increases some three to five percent over its ancestral counterpart.

In one of the embodiments of the instant invention there is disclosed a one-piece valve head and cylindrical guide member. This design is relatively inexpensive and is a most worthwhile feature of the thermostat particularly when employed in a zero-leakage thermostat such as is required by some auto manufacturers.

Lastly, in one embodiment of the invention, the valve head is dished in a concave fashion in an upstream direction so that when the valve member backs off away from its valve seat the effective flow area through the port will increase rapidly while the design still provides adequate spacing between the power unit and the downstream side of the valve head to render the power unit relatively insensitive to the temperature of liquid there.

It is therefore a principal object of the present invention to provide an improved waterline thermostat in which the thermal sensitive power unit employed therein is rendered relatively insensitive to the temperatures on the downstream side of the thermostat and thereby more accurately sensitive to the temperatures of engine coolant on the upstream side thereof.

Another object of the invention resides in the provision of a waterline thermostat having improved flow characteristics.

Yet another object of the invention relates to a waterline thermostat having the stirrup seat for the power member of a temperature sensitive power unit positioned at a point upstream of the flow port.

A still further object of the invention resides in the provision of a waterline thermostat of the general type discussed above wherein the valve head extends into the flow port in a downstream direction in order to provide satisfactory spacing between the valve head and the power unit and wherein the head is dished concavely in an upstream direction to insure a high flow rate as the valve head opens.

These and other objects, advantages, and features of the present invention will become apparent from time to time as the following specification proceeds and with reference to the accompanying drawings, wherein:

FIGURE 1 is a vertical sectional view through a waterline thermostat constructed in accordance with the principles of the present invention; and FIGURE 2 is a vertical sectional view through another embodiment of the instant invention.

The thermostat illustrated in FIGURE 1 includes generally a transverse wall piece 10 having a flow port 11 opening therethrough with which a valve member 13 is cooperable. The valve member 13 has a depending segmental cylindrical guide 14 which is guided for slidable movement within a bracket 15 which, in turn, depends from the transverse wall piece 10. A temperature sensitive power unit 16 carried by the guide 14 and having its power member 17 seated within a stirrup 18 connected to the bracket 15 serves to provide the means for moving the valve member 13 relative to the port 11; a compression spring 19 working in opposition to the power unit 16.

Looking at the structure now in more detail, the transverse wall piece 10 has a raised bead 20 formed about the periphery thereof which serves to provide a clamping surface for clamping the transverse wall piece between some gasketed plates to rigidly and sealingly mount the entire thermostat in a water flow conduit in the cooling system of an internal combustion engine. The thermostat is mounted in the conduit so that the under surface faces in an upstream direction.

The flat section of the transverse wall piece 10 leads through a curvilinear throat 21 of the gradually converging outlet port wall 22 which, in turn, terminates in a lip 23a. In the illustrated embodiment of the invention, a valve seating surface is provided in a central annular segment of the curvilinear throat 21 and it is with this seating surface that the valve member 13 cooperates.

The depending bracket 15 comprises a plurality of legs 23 which have nibs 24 at their upper ends extending through suitable apertures in the relatively flat section of the transverse wall piece 10 and which are peened over that surface to rigidly unite the bracket 15 to the wall piece 10. The legs 23 have inwardly extending flanged portions 25 which are formed integrally with a cylindrically configurated wall 26 which serves to define a cylindrical guide bore 27.

The stirrup 18 is formed integrally with the bracket 15 and extends upwardly from the cylindrical wall 26 and through the center axis of the port 11 at a point spaced a considerable distance below or upstream of the seating surface on the curved throat 21. A center section of the stirrup 18 is bent around the headed end 28 of the power member 17 to provide a socket for retaining that end of the power member.

The temperature sensitive power unit 16 is of the well known solid fill type and includes the casing 29 which, in turn, includes both a thermal sensing portion 30 and a power member guide section 31. The power member 17 is guided for axial movement within the guide 31 so that when temperatures ambient the sensing portion 30 rise above the critical temperature of the power unit the power member 17 and guide portion 31 will move extensibly relative to one another.

As has already been alluded to, one of the problems in current and prior types of waterline thermostats has been that they are susceptible to serious "overshoot" problems. For instance, if the power member 17 and/or the guide section 31 of the power unit 16 are exposed to temperatures on the downstream side of the valve seating surface and those temperatures are quite low compared to the temperature of water on the upstream side thereof, heat transfer through the walls of the power unit itself may serve to cool down the temperature sensing portion 30 of the power unit to a point such that the water surrounding the power unit must rise 40, 50 or even 60° above the so-called "critical temperature" of the power unit before the wax within the sensing portion 30 actually rises to its critical temperature and causes the valve member to unseat. This problem, of course, is dangerous in that it permits undesirably high engine temperatures. No satisfactory way has been found heretofore for obviating this objectionable characteristic since temperatures on the downstream side of the seating surface may vary widely.

Thermostats constructed in accordance with the instant invention have the power unit insulated by engine coolant from the downstream side of the valve seating surface so that this problem is obviated.

The one-piece valve member 13 includes a valve head 32 which has a central section 33 extending in a downstream direction from the seating surface 21 a considerable distance to provide adequate spacing between the surface of the head and the power unit 16 and the outer surface of the valve head is dished as at 34 in a concavely upstream direction so that maximum flow rate through the port 11 will be obtained as the valve member moves away from its respective seat. The valve head 32 has a peripheral valving surface 35 which is cooperable with the seating surface 21 to control the flow of liquid through the port 11.

A portion of the valve member 13 is bent inwardly to define an annular shoulder 36 which, in turn, leads to the cylindrical guide 14. The guide 14 has an outer diameter only slightly less than the inner diameter of the guide bore 27 so that the bore 27 will guide the valve member 13 for rectilinear axial movement. In the embodiment of the invention illustrated in FIGURE 1 an annular ring 38 fits around the thermal sensing portion 30 of the power unit 16 and abuts the under surface of the enlarged ring section of the power unit 16 and the ring 38, in turn, provides an abutment surface on its lower side.

Fingers 39 at the lower end of the cylindrical guide 14 are bent over the abutment surface on the ring 38 and a compression spring 19 is interposed between the flat annular flange 25 of the bracket 15 and the shoulder 36 to bias the valve member 13 and thereby the casing 29 of the power unit in a downstream or valve seating direction.

Large sections of the cylindrical guide 14 are cut out as can be seen at 40 so that (1) coolant on the upstream side of the seating surface 21 can circulate freely over and around the power unit 16 and (2) heat transfer through the wall of the cylindrical guide 14, itself, is thereby reduced.

A gas relief jiggle valve 41 is mounted within a small bleed port 42 and this valve, as is well understood by those skilled in the art, serves to provide a means for venting gas from the upstream side of the thermostat while impeding the flow of liquid through the valve head.

The embodiment of the invention illustrated in FIGURE 2 is much like that illustrated in FIGURE 1 and like parts are referred to by like reference numerals. No jiggle valve is provided in this embodiment of the invention and the cylindrical guide 14 is not formed integrally with the valve member but is connected thereto by means of a plurality of rivets 45. The valve head has a central section 46 which is recessed in a downstream direction but is otherwise substantially flat. The compression spring is cylindrical rather than conical in nature but its operation and cooperation with the bracket and valve head are substantially the same as has already been described.

It will be understood that various modifications and variations in the instant invention may be made without departing from the spirit and scope of the novel concepts thereof.

I claim as my invention:

1. A thermostatically actuable valve for controlling the unidirectional flow of liquid in a conduit comprising:
   a transverse wall piece having an annular valve seating surface defining a flow port therethrough,
   a bracket connected to said wall and depending therefrom in an upstream direction,
   a thermal sensitive power unit having a casing and having a power member extending therefrom upon predetermined increases in the temperatures ambient said casing,
   means mounting of said power member in engagement with a portion of said bracket at a point upstream of said valve seating surface,
   a poppet valve cooperable with said seat to control the flow of liquid through the said port,
   a member interconnecting said valve with said casing, and
   spring means interposed between said bracket and said valve biasing said valve to a seated position on said seating surface.

2. A thermostically actuable valve for controlling the unidirectional flow of liquid in a conduit comprising:
   a transverse wall piece having an annular valve seating surface defining a flow port therethrough,
   a bracket connected to said wall and depending therefrom in an upstream direction,
   a cylindrical guide bore formed within said bracket,
   a temperature sensitive power unit having a casing and having a power member extensible therefrom upon predetermined increases in the temperatures ambient said casing,
   means mounting said power member in engagement with a portion of said bracket at a point upstream of said valve seating surface,
   a poppet valve cooperable with said seat control the flow of liquid through the said port,
   a segmental cylindrical member slidably guided for axial movement within said bore interconnecting said valve with said casing, and
   spring means interposed between said bracket and said valve biasing said valve to a seated position on said seating surface.

3. A thermostatically actuable valve for controlling the unidirectional flow of liquid in a conduit comprising:
   a transverse wall piece having an annular valve seating surface defining a flow port therethrough,
   a bracket connected to said wall and depending therefrom in an upstream direction,
   a temperature sensitive power unit having a casing and having a power member extensible therefrom upon predetermined increases in the temperatures ambient said casing,
   said casing presenting an upstream-facing abutment surface,
   means mounting said power member in engagement with a portion of said bracket at a point upstream of said valve seating surface,
   a poppet valve cooperable with said seat to control the flow of liquid through the said port,
   a member connected to and extending from said valve and having lip engageable with said upstream-facing abutment surface, and
   spring means interposed between said bracket and said valve biasing said valve to a seated position on said seating surface.

4. A thermostatically actuable valve for controlling the unidirectional flow of liquid in a conduit comprising:
   a transverse wall piece having an anular valve seating surface defining a flow port threrethrough,
   a bracket connected to said wall and depending therefrom in an upstream direction,
   a stirrup connected to and extending from said bracket and intersecting the axis of the said port at a point upstream of said seating surface,
   a temperature sensitive power unit having a casing and having a power member extensible therefrom upon predetermined increases in the temperatures ambient said casing,
   means mounting said power member in engagement with said bracket,
   a poppet valve cooperable with said seat to control the flow of liquid through the said port,
   a member interconnecting said valve with said casing, and
   spring means interposed between said bracket and said valve biasing said valve to a seated position on said seating surface.

5. A thermostatically actuable valve for controlling the unidirectional flow of liquid in a conduit comprising:
   a transverse wall piece having an annular valve seating surface defining a flow port therethrough,
   a bracket connected to said wall and depending therefrom in an upstream direction and having a cylindrical guide bore formed therein,
   a stirrup connected to and extending from said bracket and intersecting the axis of the said port at a point upstream of said seating surface,
   a temperature sensitive power unit having a casing and having a power member extensible therefrom upon predetermined increases in the temperatures ambient said casing,
   means mounting said power member in engagement with said bracket,
   a poppet valve cooperable with said seat to control the flow of liquid through the said port,
   a segmental cylindrical member slidably guided for axial movement within said bore and connected to and extending from said valve, and
   spring means interposed between said bracket and said valve biasing said valve to a seated position on said seating surface.

6. A thermostatically actuable valve for controlling the unidirectional flow of liquid in a conduit comprising:
   a transverse wall piece having an annular valve seating surface defining a flow port therethrough,
   a bracket connected to said wall and depending therefrom in an upstream direction and having a cylindrical guide bore formed therein,
   a stirrup connected to and extending from said bracket and intersecting the axis of the said port at a point upstream of said seating surface,
   a temperature sensitive power unit having a casing and having a power member extensible therefrom upon predetermined increases in the temperatures ambient said casing,
   said casing presenting an upstream-facing abutment surface,
   means mounting said power member in engagement with said stirrup,
   a poppet valve cooperable with said seat to control the flow of liquid through the said port,
   a segmental cylindrical member slidably guided for axial movement within said bore and connected to said valve and having a lip engageable with said upstream-facing abutment surface,
   spring means interposed between said bracket and said valve biasing said valve to a seated position on said seating surface.

7. A thermostatically actuable valve for controlling the unidirectional flow of liquid in a conduit comprising:
   a transverse wall piece having an annular valve seating surface defining a flow port therethrough,
   a bracket connected to said wall and depending therefrom in an upstream direction and having a cylindrical guide bore formed therein,
   a temperature sensitive power unit having a casing and having a power member extensible therefrom upon predetermined increases in temperatures ambient said casing,
   said casing presenting an upstream-facing abutment surface,
   means mounting said power member in engagement with a portion of said bracket at a point upstream of said valve seating surface,
   a valve member having a valve head cooperable with said seating surface to control the flow of liquid through said port and having a cylindrical guide connected therewith and depending therefrom and slidably guided for axial movement within said guide bore,
   said cylindrical guide having an inturned finger at its lower end bent about a portion of said casing and adjacent said seating surface, and
   spring means interposed between said bracket and said valve member and biasing said valve head to a seated position on said seating surface.

8. A thermostatically actuable valve for controlling the unidirectional flow of liquid in a conduit comprising:
   a transverse wall piece having an annular valve seating surface defining a flow port therethrough,
   a bracket connected to said wall and depending therefrom in an upstream direction,
   a temperature sensitive power unit having a casing and having a power member extensible therefrom upon predetermined increases in temperatures ambient said casing,
   said casing presenting an upstream-facing abutment surface,
   means mounting said power member in engagement with a portion of said bracket at a point upstream of said valve seating surface,
   a valve member having a valve head cooperable with said seating surface to control the flow of liquid through said port and having a cylindrical guide formed integrally therewith and depending therefrom and slidably guided for axial movement within said bracket,
   said cylindrical guide having an inturned finger at its lower end bent about a portion of said casing and engageable with said seating surface, and
   spring means interposed between said bracket and said valve member and biasing said valve head to a seated position on said seating surface.

9. A thermostatically actuable valve for controlling the unidirectional flow of liquid in a conduit comprising:
   a transverse wall piece having an annular valve seating surface defining a flow port therethrough,
   a bracket connected to said wall and depending therefrom in an upstream direction,
   and having a cylindrical guide bore formed therein, a stirrup connected to and extending from the said bracket and intersecting the axis of the said port at a point upstream of said seating surface,
   a temperature sensitive power unit having a casing and having a power member extensible therefrom upon predetermined increases in temperatures ambient said casing,
   said casing presenting an upstream casing abutment surface,
   means mounting said power member in engagement with said stirrup, a valve member having a valve head cooperable with said seating surface to control the flow of liquid through said port and having a cylindrical guide formed integrally therewith and depending therefrom and slidably guided for axial movement within said guide bore, said cylindrical guide having an inturned finger at its lower end bent about a portion of said casing and engaging said seating surface, and spring means interposed between said bracket and said valve member and biasing said valve head to a seated position on said seating surface.

10. A thermostatically actuable valve constructed in accordance with claim 2 wherein said poppet valve and said segmental cylindrical member are formed integrally with one another.

11. A thermostatically actuable valve constructed in accordance with claim 2 wherein the major part of said segmental cylindrical guide is cut away to permit a free flow of liquid about said power unit to minimize heat transfer between the downstream surface of said valve and said casing.

12. A thermostatically actuable valve constructed in accordance with claim 5 wherein the major part of said segmental cylindrical guide is cut away to permit a free flow of liquid about said power unit to minimize heat transfer between the downstream surface of said valve and said casing.

13. A thermostatically actuable valve constructed in accordance with claim 1 wherein the downstream-facing surface of said valve is dished concavely in an upstream direction and has a portion extending in a downstream direction from said seating surface to provide for maximum unimpeded liquid flow through the said port upon opening of said valve.

14. A thermostatically actuable valve constructed in accordance with claim 7 wherein the downstream-facing surface of said valve head is dished concavely in an upstream direction and has a central portion extending in a downstream direction from said seating surface to provide for maximum unimpeded liquid flow upon opening of said valve.

15. A thermostatically actuable valve constructed in accordance with claim 9 wherein a gas bleed jiggle valve is mounted within said valve head.

References Cited by the Examiner

UNITED STATES PATENTS

| | | | |
|---|---|---|---|
| 2,829,835 | 4/1958 | Branson | 236—34.5 |
| 2,873,070 | 2/1959 | Drapeau | 236—34 |

EDWARD J. MICHAEL, *Primary Examiner*.